United States Patent Office 3,738,925
Patented June 12, 1973

3,738,925
CONCENTRATION PROCESS
Brian Alfred Cooke, Knotty Green, England, assignor to Imperial Chemical Industries Limited, London, England
No Drawing. Filed Mar. 19, 1971, Ser. No. 126,317
Claims priority, application Great Britain, Mar. 26, 1970, 14,833/70
Int. Cl. B01k 5/00, 5/02; B01d 13/02
U.S. Cl. 204—180 P                    28 Claims

ABSTRACT OF THE DISCLOSURE

Paint compositions, in which pigment, ionised binder and binder counter-ion are dispersed in a continuous medium, are concentrated under the influence of an electric field between barriers of material permeable to continuous medium and binder counter-ion but impermeable to pigment and ionised binder. Diluted aqueous paints, particularly when obtained by rinsing articles coated by electrodeposition, are treated to provide a more suitable effluent.

BACKGROUND OF THE INVENTION

This invention relates to the concentration of paint compositions.

The invention is particularly concerned with the concentration of paint compositions which comprise a continuous medium, a pigment, and an ionisable binder, at least a part of the binder associating with and conferring an ionic charge upon the particles of pigment. There will also exist in the continuous medium counter-ions corresponding to the ionised binder. The nature of the continuous medium will be such that at least part of the binder is ionised.

It is desirable to be able to adjust the relative proportions of continuous medium and dispersed binder and pigment in paint since these proportions determine important characteristics of the paint such as flow. Although it is a straightforward matter to increase the proportion of continuous medium by further addition of suitable liquid, it is difficult to decrease the proportion of continuous medium, particularly when this involves the removal of a large volume of liquid. Volatilisation of such a liquid on a large scale is usually uneconomic and may be hazardous and harmful to the dispersed material.

In certain painting processes there may arise a diluted paint which contains such a high proportion of continuous medium relative to pigment and binder that it is virtually useless unless it can be concentrated. There may also be an objection to this diluted paint as an effluent. When articles are painted by electrodeposition from an aqueous continuous medium, for example, it is generally desired to remove excess undeposited paint from the painted articles by rinsing with water. The rinsings contain such a small proportion of paint binder and pigment relative to the proportion of aqueous medium that they cannot be re-used in the process, but if they are discarded there is loss of useful paint constituents and the rinsings may also be unacceptable as an industrial effluent.

SUMMARY OF THE INVENTION

We have found that paint compositions can be concentrated under the influence of an electric field and according to the invention we provide a method of concentrating a composition comprising a continuous medium, an ionised binder, a pigment having a specific gravity greater than that of the continuous medium, and a counter-ion of the ionised binder, which comprises the steps (a) introducing the composition into a chamber, two opposed walls of which are provided by barriers of material substantially impermeable to ionised binder and pigment but permeable to the counter-ion, (b) passing an electric current across the chamber and through the barriers, (c) separating those components of the composition which accumulate under the influence of the electric current in the region of the barrier surfaces, and (d) withdrawing the separated components.

We find that under the influence of an electric field ionised binder and associated pigment particles migrate towards one pole of the electric field, their migration being arrested by an impermeable barrier surface which defines a wall of the chamber so that there is an increase in concentration of binder and pigment particles in the region of that barrier surface.

At the same time the continuous medium in the region of the surface of the barrier nearest the other pole is depleted in binder and pigment. Counter-ion of the ionised binder migrates towards the other pole of the electric field and is free to leave the chamber.

Thus, while there is provided a method for producing a composition comprising binder and pigment which is more concentrated and more useful than the original composition there is also provided a method for producing a continuous medium which is so depleted in paint constituents that this continuous medium may be suitable to discard without serious loss of materials and with less risk of an effluent objection than with the original composition, or to use as a rinse for articles coated by electrodeposition.

DETAILED DESCRIPTION OF THE INVENTION

In one method of separating those components of the composition which accumulate at the barrier surfaces the barriers are arranged to be substantially vertical and in substantially parallel spaced relationship so that the composition of increased concentration of ionised binder and pigment which accumulates in the region of one barrier sinks down the barrier surface towards the bottom of the chamber under the influence of gravity, and correspondingly the continuous medium depleted in ionised binder and pigment in the region of the other barrier rises towards the top of the chamber. In this method the concentrated and depleted compositions can be readily withdrawn from the bottom and the top of the chamber respectively or from any other suitable location. The process is equally applicable to a series of chambers through which an electric current is passed and separation of concentrated and depleted compositions achieved. In such circumstances it may be convenient to withdraw the separated compositions from reservoirs in liquid communication with the bottom and top respectively of each chamber.

Separation of the compositions at the barrier surfaces may be achieved or accelerated by mechanical forces, for example by suitably placed impellors which impel the compositions in an appropriate direction.

As indicated above the process is applicable to one or more chambers containing a paint composition to be concentrated and preferably the method comprises a step in which the composition is introduced into a plurality of chambers. The chambers may be comprised of barriers arranged in series, for example, whereby each inner barrier of the series is common to two chambers, and the concentrated composition which results from the application of a common electric current through the chambers is withdrawn from a suitable region which is in liqiud communication with each chamber. Clearly, a plurality of chambers in series has the advantages of compactness and electrical efficiency as compared with a similar number of isolated chambers. Alternatively, the compositions withdrawn as separated components from one chamber or series of chambers may be introduced into a further chamber or into further chambers as in cascade operation in order to effect further separation under the influence of an electric field.

We find that when a first composition is separated into a second composition substantially depleted in pigment and binder and a third composition concentrated in pigment and binder, and the second composition still contains residual binder and/or other paint constituents which are undesired in an effluent or are desired in the paint concentrate, then it may be advantageous to introduce this separated composition into one or more further separation chambers and to combine the concentrated composition from such chamber or chambers with the third separated composition. The continuous medium further depleted in binder and/or other paint constituents may then be further treated or passed as an effluent.

When it is required to confine the continuous medium of a composition substantially to that chamber to which it has been added it is of course necessary to employ barriers of a material which is substantially impermeable to the continuous medium under the conditions of operation, but which is permeable to counter-ion.

In one preferred manner of carrying out the method of the invention the spaced barriers defining opposed walls of a chamber are located between and transversely to the electrodes of an electrolytic cell. Electrolytic communication between the electrodes of the cell and through the chamber may be improved by the addition of suitable electrolyte to those regions of the cell surrounding the electrodes, e.g. by the addition of salts, acids or alkalis. Preferably there is added to the regions of the cell which contain the electrodes an electrolyte having an ion which has the same identity as the counter-ion of the binder.

An electric current is passed between the cell electrodes so the counter-ion is depleted in the region of one electrode and accumulates in the region of the other electrode. Suitable means for maintaining a proportion of electrolyte in the region of the one electrode may be necessary and include, for example, the recycling of electrolyte thereto from the region of the other electrode.

It may be convenient, as concentration proceeds, to effect periodic reversal of the direction of flow of the electric current. Current reversal is found to aid the gravitational separation of the concentrated composition in the region of a barrier and also the necessary power input may be less than when uni-directional current is used.

Since certain membranes useful as barriers are flexible and deficient in dimensional stability there may be difficulty in maintaining a desired distance of separation between the barriers providing opposed walls for a chamber. In order to achieve the necessary separation we find it advantageous to separate the barriers providing the opposed walls by a perforated and preferably corrugated spacer made of plastic or similar chemically-resistant material. Preferably the corrugations of the spacer are arranged in a vertical direction to provide vertical channels when separation of the concentrated composition is effected solely under the influence of gravity.

The term "pigment" includes colouring or opacifying pigments, extending pigments, fillers, and other insoluble particulate material which is not considered as a binder used in the formulation of paints.

Suitable colouring or opacifying pigments include, for example, the iron oxides, whether black, yellow, red or brown; lead chromate; basic lead silico chromate; strontium chromate; chrome green; chrome oxide green; phthalocyanine blue; phthalocyanine green; red lead; cobalt blue; graphite; vegetable carbon black; mineral carbon black; metallic aluminium; metallic lead; metallic zinc; white lead sulphate; white lead carbonate; zinc oxide; rutile titanium dioxide; anatase titanium dioxide; zinc sulphide and zirconium oxide.

Suitable extending pigments or fillers include for example barium sulphate; calcium sulphate; calcium carbonate; magnesium carbonate; calcium silicate; magnesium silicate and silica.

The particularly suitable pigments are those of high specific gravity relative to the continuous medium and in general the preferred pigments have specific gravity at least 0.5 greater than that of the continuous medium. Preferred pigments include the iron oxides, titanium dioxide, zinc oxide, zinc sulphide and basic lead silico chromate.

The ionised binder is dispersed in the continuous medium in any suitable stable form and the dispersion may, for example, be in the form of an apparently true, micellar or colloidal solution or as a particulate dispersion or emulsion.

Certain binders are capable of ionisation in organic liquids particularly in strongly polar liquids, for example copolymers of styrene and maleic anhydride in dimethyl formamide, and these may comprise the ionised binder and continuous medium respectively in compositions to which the present invention may be applied.

Particularly suitable ionisable binders, however, are those which ionise in an aqueous medium; such binders in aqueous media are commonly used in well established painting processes, for example in dipping and electrodeposition processes. Suitable ionisable groups in these binders include for example carboxyl, sulphonic or phosphonic acid groups and ionisation of these groups in the continuous medium is preferably achieved in the presence of a base, for example an inorganic base or an organic amine, the base ion then constituting the counter-ion which can permeate the barriers defining at least a part of the chamber used in the present method. Other suitable ionisable groups which may be present in film-forming binders include basic nitrogen-containing groups which may be ionised in an aqueous continuous medium in the presence of an acid, the ionised acid radical then constituting the counter-ion.

The preferred film-forming binders are the polycarboxylic acid resin binders, and these include, for example, alkyd resins modified or unmodified with drying or non-drying oil residues, maleinised drying oils, esters of polyols with saturated or unsaturated fatty acids, epoxy resin esters with saturated or unsaturated fatty acids, and vinyl polymers which contain acid groups. Examples of alkyd resins are those based on trimellitic anhydride; examples of polyol esters, and including epoxy resin esters, are given in British Pat. No. 1,069,841; and examples of vinyl polymers include the copolymer of acrylic acid, a hydroxy alkyl methacrylate and styrene.

These polycarboxylic resin binders may be ionised in aqueous medium in the presence of an inorganic base for example sodium or potassium hydroxide, ammonia, or an organic amine, for example triethylamine, diethanolamine or butylamine.

Certain film-forming binders may carry an ionic charge by virtue of their association with an ionic surfactant i.e. an anionic or cationic surfactant, to impart dispersibility to the binder in an aqueous medium. Film-forming binders which are dispersed in aqueous medium in the presence of an ionic surfactant include for example, styrene/butadiene copolymers and methyl methacrylate/styrene copolymers.

There may also be present in the paint composition other materials, soluble or insoluble in the continuous medium, which contribute to a final paint coating, for example crosslinking agents such as melamine/formaldehyde, urea/formaldehyde and phenol/formaldehyde resins.

In referring to an aqueous medium in this specification we mean that the medium comprises at least 25% by weight of water based on the total weight of the medium, and preferably at least 50% by weight of water. The aqueous medium may also comprise an organic liquid which is water-miscible or water-soluble, for example lower aliphatic alcohols such as propanol or butanol, lower glycols and their ethers such as the monomethyl ether of ethylene glycol and aliphatic hydrocarbons. A small proportion of water-immiscible or water-insoluble organic liquid may also be present.

The barriers of material impermeable to ionised binder and dispersed pigment may be conventional dialysis membranes of pore size in the range 10,000–50 A. These barriers may be made, for example, from regenerated cellulose, cellulose esters such as the cellulose acetates and nitrates, or porous thermoplastic sheet materials such as polyvinyl chloride sheet. These conventional dialysis membranes are, however, permeated by the continuous medium to varying extents depending upon their pore size, and there is a large water flux due to electro-osmosis. Moreover, when a conventional dialysis membrane of small pore size is employed to counteract electro-osmosis and to prevent the passage of ionised binder and dispersed pigment, these conventional membranes normally have a high electrical resistance which requires a high power input during the concentration process.

Preferred membranes which have such small pore size that they are impermeable to ionised binder and pigment and also, substantially, to the continuous medium are those comprising ion exchange material; these membranes have low electrical resistance. Preferably they have a pore size of less than 20 A. Suitable ion exchange membranes include those prepared by incorporating finely divided ion exchange resin into an inert polymer matrix, for example, those of fine beads of sulphonated cross-linked polystyrene in polyethylene, and other suitable membranes include those comprising a sheet of ion exchange material, optionally with a fabric support.

The present method of concentrating paint compositions is particularly suitable for concentrating the diluted aqueous composition which is produced by rinsing excess paint from an article painted by electrodeposition. In order to produce a useful concentrated paint composition from the diluted composition it is desirable to remove excess water without unduly impairing the stability of the dispersion of pigment and film-forming binder and at the same time it is desirable to discard an aqueous effluent which contains a minimum of paint constituents. In the present method we have found that these desired features can be achieved if suitable operating conditions are selected.

Rinse water containing ionised binder and pigment, which arises from a rinsing stage, may be treated directly by the present method in one or a series of adjacent chambers. The resulting concentrate may then be returned to the painting tank, optionally by way of a mixing unit to incorporate this dispersion with a more concentrated dispersion or alternatively it may first be further cycled through one or more further concentration chambers. Alternatively the initial rinse water may be returned directly to the paint tank and the tank contents concentrated by the present method. Similarly the continuous medium depleted in ionised binder and pigment may be recycled, if necessary, to obtain a product substantially free from useful paint constituents before treatment as an effluent. The method is also suitable for treating any electrodeposition bath in situ whether diluted with rinse water or not.

The invention is illustrated by the following examples in which parts and percentages are by weight unless otherwise stated.

EXAMPLE 1

In this example a diluted aqueous paint comprising ionised binder and pigment was separated into fractions. One fraction contained more paint binder and pigment and another fraction less paint binder and pigment relative to the aqueous medium than did the initial diluted paint.

Four sheets of a cationic exchange membrane, believed to contain sulphonate groups and commercially available as "Ionac" MC 3470 ("Ionac" is a registered trademark), each having dimensions 12 cm. x 10 cm., were arranged in vertical spaced parallel relationship so that there was a distance of 9.5 mm. between the sheets. Side walls and a bottom to each of the three chambers between the opposed sheets of membrane were provided by impermeable polymethyl methacrylate sheet, the top of the chambers being open to the atmosphere. The assembly was placed between, and with the sheets of membrane transverse etc. the stainless steel electrodes of an electrolytic cell which contained 0.2 N potassium hydroxide.

To each of the three chambers was added 120 mls. of a stable diluted aqueous paint having 0.82% solids content. This diluted paint was representative of a composition produced by rinsing excess paint from an article painted by electrodeposition using a paint of 10% solids content. The paint binder was an epoxy resin ester of dehydrated castor oil fatty acid and maleinised linseed oil fatty acid of acid value 85 in which 60% of the free acid groups had been neutralised with potassium hydroxide. The pigment content of the paint was a 4:1 mixture of rutile titanium dioxide and red iron oxide, the pigment volume concentration relative to binder being 6%.

A current of 120 milliamps was passed during 30 minutes between the cell electrodes, the voltage being between 8 and 9 volts. At the end of this period of time samples of the dispersion withdrawn from the highest region of each of the three chambers contained on average 0.15% solids whereas samples withdrawn from the lowest region of each of the three chambers contained on average 3.4% solids.

EXAMPLE 2

In this example a diluted aqueous paint was concentrated by circulating it into the lower regions of a series of chambers, continuous medium substantially depleted in binder and pigment being withdrawn from the top of the chambers and the relatively concentrated paint withdrawn from the bottom of the chambers.

Thirteen sheets of the cationic exchange membrane employed in Example 1, but of dimensions 16.5 cm. x 11.5 cm. were assembled in vertical spaced parallel relationship so that there was a distance of 4.5 mm. between the sheets. A series of twelve chambers open at the top and the bottom, was produced from those membranes by forming side walls of poly methyl methacrylate sheet and the chamber assembly was interposed between, and with the membrane transverse to, the stainless steel electrodes of an electrolytic cell, containing 0.2 N potassium hydroxide. The electrodes were each separated by a cation exchange membrane from the chamber assembly.

A diluted aqueous paint (representative of a composition produced by rinsing excess paint from an article painted by electrodeposition) containing 1.13% solids, the solids having the same composition as the paint of Example 1, was circulated into the lower regions of the chambers whilst a current of 140 milliamps was passed between the electrodes of the electrolytic cell. At the same time relatively concentrated paint was withdrawn from the bottom of the chambers and recirculated, whilst aqueous medium, which was substantially free from dispersed pigment so that it could be treated as effluent, was removed from the top of the chambers. The level of diluted paint in the chambers was maintained constant by a suitable constant level device which equilibrated the circulation of paint and the removal of liquid from the top of the chambers.

After circulating 8 litres of diluted paint initially containing 1.13% solids for 3½ hours and feeding this paint to the chambers at a rate of 1.7 litres/hour the circulating paint had a solids content of 1.7%.

I claim:

1. A method of concentrating a paint composition, said composition comprising a continuous medium, an ionised paint binder, a pigment having a specific gravity greater than that of the continuous medium, and a counter-ion of the ionised binder, the method comprising the steps of:
(a) introducing the composition into a chamber, said chamber being defined between walls, two of which walls are opposed to each other and comprise barriers of material substantially impermeable to ionised binder and pigment but permeable to the counter-ion, said barriers positioned between and transversely to the electrodes of an electrolytic cell,
(b) passing an electric current between the electrodes of the electrolytic cell and through the chamber,
(c) separating a component of the composition more concentrated in the ionized binder and pigment which is attracted towards one of the electrodes and which accumulates under the influence of the electric current in the chamber in the region of one barrier surface, from a component of the composition depleted in ionised binder and pigment which accumulates within the chamber in the region of the other barrier surface, and
(d) withdrawing the separated components of the composition from the chamber.

2. A method according to claim 1 wherein the barriers are substantially vertical and in substantially parallel spaced relationship to each other.

3. A method according to claim 1 wherein the composition is introduced into a plurality of chambers.

4. A method according to claim 3 wherein the chambers are comprised of a series of barriers, each inner barrier of the series being common to two chambers.

5. A method according to claim 1 wherein a composition withdrawn as a separated component from one or more chambers is introduced into a further chamber or chambers.

6. A method according to claim 5 wherein a first composition is separated into a second composition depleted in pigment and binder and a third composition concentrated in pigment and binder, and the second composition is subsequently introduced into a further chamber or chambers and a fourth composition concentrated in pigment and binder obtained therefrom is combined with the third composition.

7. A method according to claim 1 wherein the barriers are located between and transversely to the electrodes of an electrolytic cell.

8. A method according to claim 7 wherein an electrolyte is added to the regions of the cell which surround the electrodes.

9. A method according to claim 8 wherein the added electrolyte has an ion which is of the same constitution as the binder counter-ion.

10. A method according to claim 1 wherein the direction of flow of the electric current is periodically reversed.

11. A method according to claim 1 wherein at least one of the barriers of material impermeable to ionised binder and pigment is a conventional dialysis membrane of pore size in the range 10,000–50 A.

12. A method according to claim 1 wherein at least one of the barriers of material impermeable to ionised binder and pigment is a membrane comprised of ion exchange material.

13. A method according to claim 12 wherein the membrane has a pore size of less than 20 A.

14. A method according to claim 1 wherein two adjacent barriers are separated by a perforated spacer.

15. A method according to claim 1 wherein the pigment has a specific gravity at least 0.5 greater than that of the continuous medium.

16. A method according to claim 15 wherein the pigment is titanium dioxide or an iron oxide.

17. A method according to claim 1 wherein the continuous medium is an aqueous medium.

18. A method according to claim 1 wherein the ionised binder is a polycarboxylic acid resin.

19. A method according to claim 18 wherein the polycarboxylic acid resin is an epoxy ester resin.

20. A method according to claim 18 wherein the counter-ion is an amine ion or an inorganic base ion.

21. A method according to claim 20 wherein the inorganic base ion is potassium.

22. A method according to claim 18 wherein there is present in the composition a crosslinking agent.

23. A method of concentrating the contents of a painting tank used for coating articles by electrodeposition according to claim 1.

24. A method of concentrating a diluted paint composition according to claim 1 wherein the composition is produced by rinsing excess paint from an article painted by electrodeposition.

25. A method of concentrating a diluted paint composition according to claim 24 wherein the diluted composition is first passed into a tank from which articles are painted by electrodeposition.

26. A method according to claim 24 wherein a concentrated paint composition is returned to a painting tank.

27. A method according to claim 23 wherein a resulting composition depleted in pigment and binder is used to rinse excess paint from articles painted by electrodeposition.

28. A method of concentrating a paint composition, said composition comprising a continuous medium, an ionised paint binder, a counter-ion of the ionised paint binder and a pigment having a specific gravity greater than that of the continuous medium, the method comprising the steps of:
(a) providing an electrolytic cell containing an anode electrode and a cathode electrode;
(b) providing within said electrolytic cell a chamber defined by two walls which are opposed to each other and positioned between and transversely to the electrodes of said electrolytic cell, said walls being substantially impermeable to said ionised binder and said pigment but permeable to said counter-ion;
(c) introducing said paint composition into said chamber;
(d) passing an electric current between the electrodes of said electrolytic cell and through said chamber;
(e) separating a first component of said paint composition more concentrated in said ionised binder and said pigment, said first component being attracted towards one of the electrodes and accumulating within said chamber in the region of the chamber wall surface nearest the attracting electrode, from a second component of said paint composition depleted in said ionised binder and said pigment, said second component accumulating within said chamber in the region of the opposing chamber wall; and
(f) withdrawing said first and second components of said paint composition separated in step (e) from said container.

References Cited
UNITED STATES PATENTS

| | | | |
|---|---|---|---|
| 3,230,162 | 1/1966 | Gilchrist | 204—180P X |
| 3,304,250 | 2/1967 | Gilchrist | 204—180P X |

JOHN H. MACK, Primary Examiner

A. C. PRESCOTT, Assistant Examiner

U.S. Cl. X.R.

204—180 R, 181, 301

UNITED STATES PATENT OFFICE
CERTIFICATE OF CORRECTION

Patent No. 3,738,925      Dated June 12, 1973

Inventor(s)  Brian Alfred Cooke

It is certified that error appears in the above-identified patent and that said Letters Patent are hereby corrected as shown below:

Please amend claim 1 as follows:

Claim 1, line 12, following "barriers" insert --being--.

Signed and sealed this 18th day of December 1973.

(SEAL)
Attest:

WARD M. FLETCHER, JR.
Attesting Officer

RENE D. TEGTMEYER
Acting Commissioner of Patents